US011379087B2

(12) United States Patent
Sugiyama

(10) Patent No.: US 11,379,087 B2
(45) Date of Patent: Jul. 5, 2022

(54) TOUCH PANEL INPUT DEVICE

(71) Applicant: SHARP KABUSHIKI KAISHA, Sakai (JP)

(72) Inventor: Koichi Sugiyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/335,651

(22) Filed: Jun. 1, 2021

(65) Prior Publication Data

US 2021/0382583 A1 Dec. 9, 2021

(30) Foreign Application Priority Data

Jun. 5, 2020 (JP) .............................. JP2020-098538

(51) Int. Cl.
*G06F 3/044* (2006.01)
*G06F 3/041* (2006.01)
(52) U.S. Cl.
CPC .......... *G06F 3/0446* (2019.05); *G06F 3/0418* (2013.01); *G06F 3/0445* (2019.05)
(58) Field of Classification Search
CPC ..... G06F 3/0446; G06F 3/0418; G06F 3/0445
See application file for complete search history.

(56) References Cited

U.S. PATENT DOCUMENTS

| 5,006,838 | A | * | 4/1991 | Fujioka | .................... G09G 3/30 |
| | | | | | 315/169.3 |
| 5,335,230 | A | * | 8/1994 | Crooks | ................... G06F 3/045 |
| | | | | | 714/48 |
| 5,550,329 | A | * | 8/1996 | Matsubayashi | ......... G06F 3/045 |
| | | | | | 178/18.05 |
| 5,777,604 | A | * | 7/1998 | Okajima | ................. G06F 3/045 |
| | | | | | 345/173 |
| 9,678,598 | B2 | * | 6/2017 | Mamba | .................. G06F 3/0446 |
| 9,727,187 | B2 | * | 8/2017 | Slamkul | ................ G06F 3/0445 |
| 9,927,925 | B2 | * | 3/2018 | Teranishi | .............. G06F 3/0412 |
| 10,444,892 | B2 | * | 10/2019 | Portmann | ............... G06F 3/044 |
| 2003/0222660 | A1 | * | 12/2003 | Morimoto | ............... G01L 1/142 |
| | | | | | 324/661 |
| 2011/0128254 | A1 | * | 6/2011 | Teranishi | .............. G06F 3/0412 |
| | | | | | 345/174 |
| 2011/0227862 | A1 | * | 9/2011 | Lim | ...................... G06F 3/0446 |
| | | | | | 345/174 |
| 2012/0050216 | A1 | * | 3/2012 | Kremin | ............. G06F 3/041661 |
| | | | | | 345/174 |

(Continued)

FOREIGN PATENT DOCUMENTS

JP 2016-071842 A 5/2016

*Primary Examiner* — Amy Onyekaba
(74) *Attorney, Agent, or Firm* — ScienBiziP, P.C.

(57) ABSTRACT

A touch panel input device includes a plurality of first electrode lines, a plurality of second electrode lines, a drive circuit, a reception circuit, a touch detector, a ground state switching circuit, and a controller. The controller executes drive control for causing the drive circuit to sequentially input a drive signal to electrode lines in a non-ground state among each of the plurality of first electrode lines, in a state of controlling the ground state switching circuit to set a part of electrode lines among each of the plurality of first electrode lines and/or the plurality of second electrode lines to the non-ground state, and set the other electrode lines to a ground state.

5 Claims, 9 Drawing Sheets

(56) References Cited

U.S. PATENT DOCUMENTS

| | | | |
|---|---|---|---|
| 2012/0139868 A1* | 6/2012 | Mamba | G06F 3/0446 345/174 |
| 2012/0256644 A1* | 10/2012 | Fujiyoshi | G06F 3/0446 324/679 |
| 2012/0280698 A1* | 11/2012 | Oya | G01R 27/2605 324/658 |
| 2013/0015868 A1* | 1/2013 | Peng | G06F 3/0446 324/688 |
| 2014/0078104 A1* | 3/2014 | Lee | G06F 3/0445 345/174 |
| 2014/0160371 A1* | 6/2014 | Tokita | G02F 1/133528 349/12 |
| 2014/0346029 A1* | 11/2014 | Sekizawa | G06F 3/0445 200/600 |
| 2015/0185910 A1* | 7/2015 | Zhang | G02B 5/18 345/174 |
| 2015/0185936 A1* | 7/2015 | Kim | G06F 3/0412 345/174 |
| 2015/0370401 A1* | 12/2015 | Mizuhashi | G06F 3/0446 345/174 |
| 2016/0062537 A1* | 3/2016 | Kim | G06F 3/0446 345/174 |
| 2016/0147339 A1* | 5/2016 | Teranishi | G06F 3/0412 345/174 |
| 2016/0291786 A1* | 10/2016 | Yokoi | G06F 3/0416 |
| 2016/0349872 A1* | 12/2016 | Hargreaves | G06F 3/0443 |
| 2017/0108972 A1* | 4/2017 | Kurasawa | G06F 3/0412 |
| 2017/0147140 A1 | 5/2017 | Kosugi et al. | |
| 2017/0192555 A1* | 7/2017 | Li | G06F 3/044 |
| 2018/0088706 A1* | 3/2018 | Tanemura | G06F 3/04164 |
| 2018/0113511 A1* | 4/2018 | Haga | G06F 3/016 |
| 2018/0113558 A1* | 4/2018 | Cho | G06V 40/1306 |
| 2022/0004303 A1* | 1/2022 | Kakinoki | G06F 3/03548 |

* cited by examiner

TOUCH PANEL INPUT DEVICE

INCORPORATION BY REFERENCE

This application is based upon and claims the benefit of priority from the corresponding Japanese Patent Application No. 2020-98538 filed on Jun. 5, 2020 under 35 USC 119, the entire contents of which is incorporated herein by reference.

BACKGROUND

Field of the Invention

The present disclosure relates to a touch panel input device.

Description of the Background Art

A touch sensor includes a plurality of first and second electrodes that intersect each other. The touch sensor detects a touch position based on a change in capacitance between the first and second electrodes.

SUMMARY

According to a first aspect of the present disclosure, a touch panel input device includes a touch surface. The touch panel input device includes a plurality of first electrode lines, a plurality of second electrode lines, a drive circuit, a reception circuit, a touch detector, a ground state switching circuit, and a controller. The plurality of first electrode lines are arranged to extend along a first direction. The plurality of second electrode lines are arranged to extend along a second direction to intersect with the plurality of first electrode lines at a plurality of intersections. The drive circuit inputs a drive signal to each of the plurality of first electrode lines. The reception circuit detects an output signal on each of the plurality of second electrode lines. The touch detector detects a touch on the touch surface based on a change in the output signals detected by the reception circuit caused by a change in capacitance at the intersections. The ground state switching circuit switches between a ground state and a non-ground state for each electrode line of the plurality of first electrode lines and/or the plurality of second electrode lines. The controller controls the drive circuit, the touch detector, and the ground state switching circuit. The controller executes drive control for causing the drive circuit to sequentially input a drive signal to electrode lines in the non-ground state among each of the plurality of first electrode lines, in a state of controlling the ground state switching circuit to set a part of electrode lines among each of the plurality of first electrode lines and/or the plurality of second electrode lines to the non-ground state, and set the other electrode lines to the ground state.

DETAILED DESCRIPTION

Figure 1:
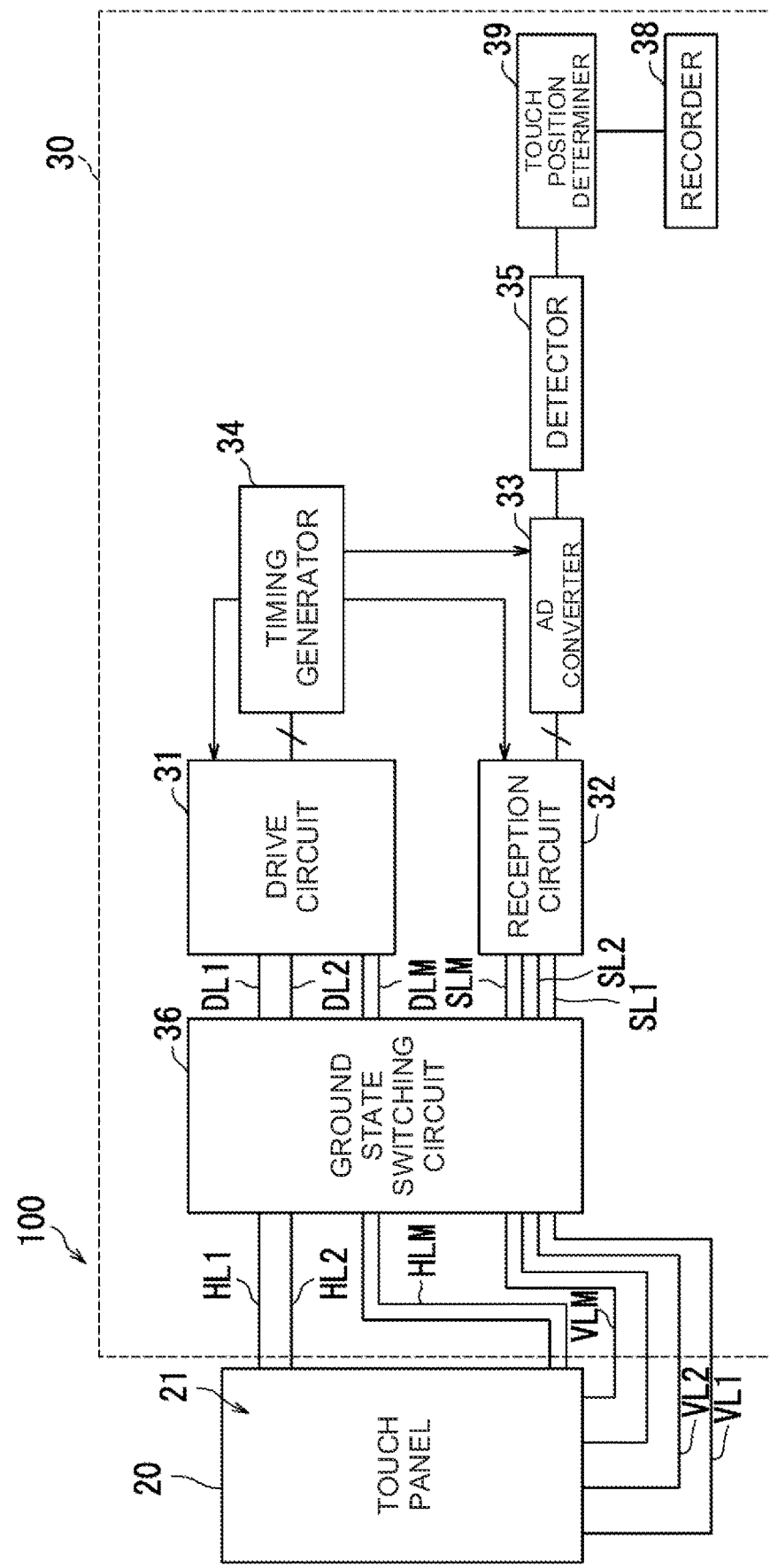
FIG. 1 is a block diagram illustrating a configuration of a touch panel input device according to a first embodiment of the present disclosure.

Hereinafter, embodiments of the present disclosure will be described with reference to the drawings. It should be noted that in the drawings, the same or corresponding portions are denoted by the same reference numerals and the description thereof will not be repeated.

First Embodiment

Figure 2:
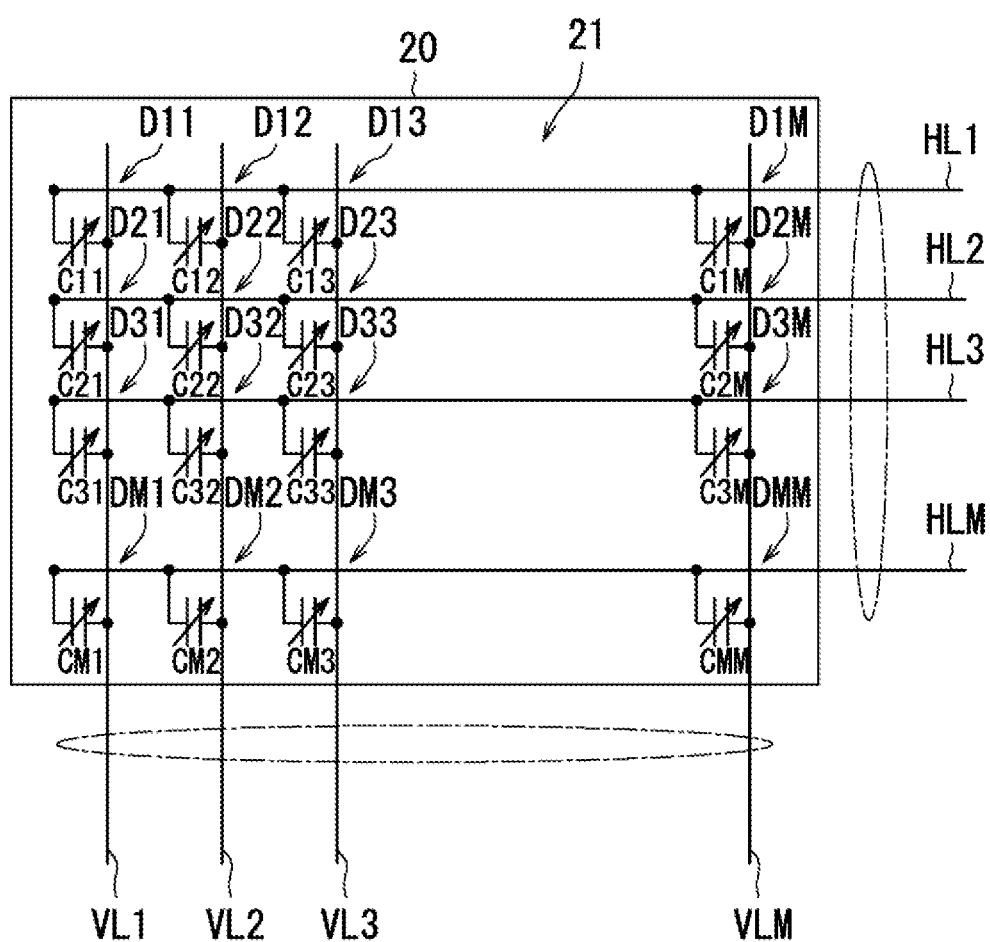
FIG. 2 is a schematic diagram illustrating a configuration of a touch panel provided in the touch panel input device.
Figure 3:
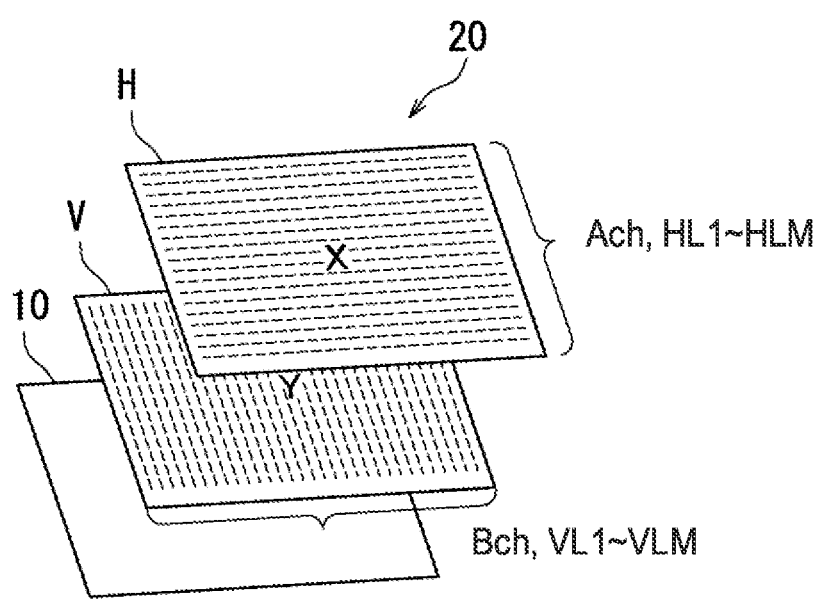
FIG. 3 is an explanatory diagram illustrating a schematic configuration of the touch panel.
Figure 4:
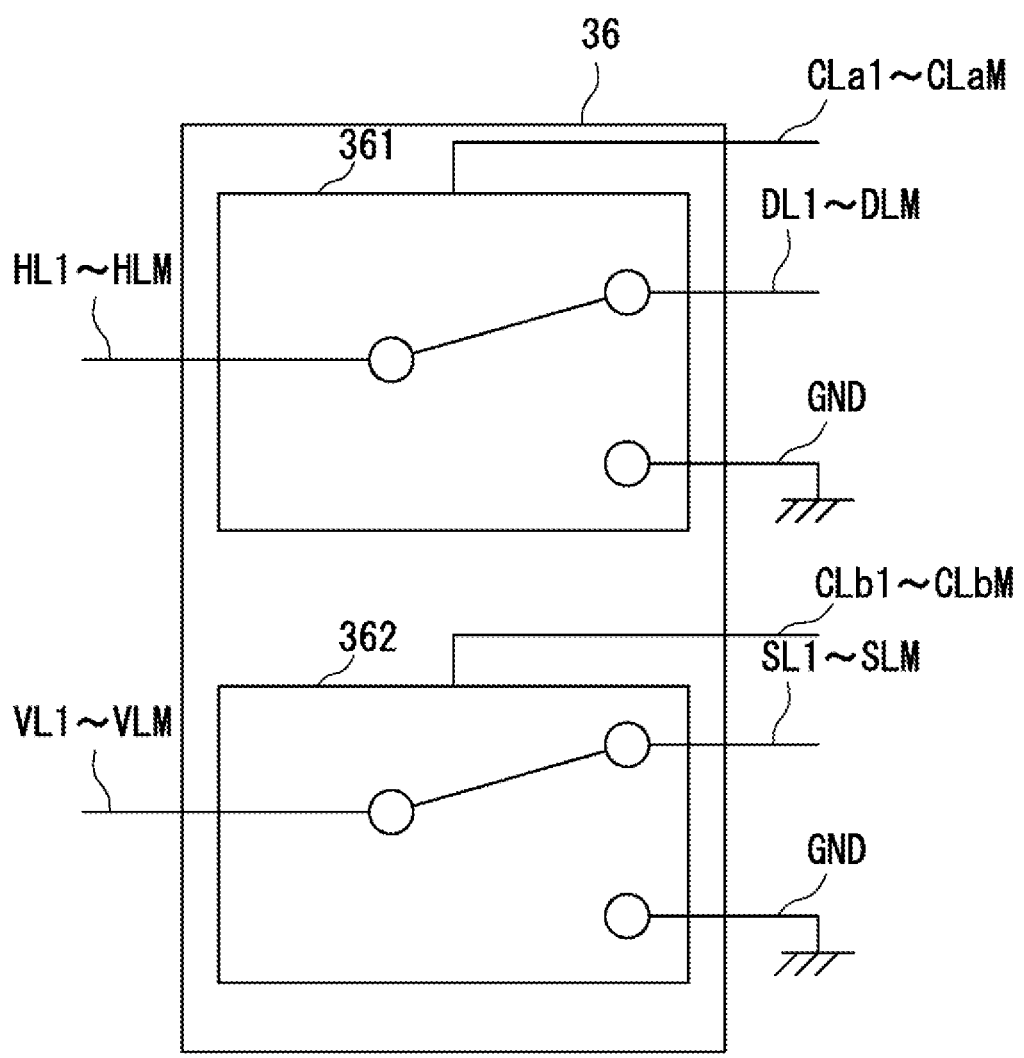
FIG. 4 is a diagram illustrating a ground state switching circuit.

A touch panel input device 100 according to a first embodiment of the present disclosure will be described with reference to FIGS. 1 to 4. FIG. 1 is a block diagram illustrating a configuration of the touch panel input device 100 according to the first embodiment of the present disclosure. FIG. 2 is a schematic diagram illustrating a configuration of a touch panel 20 provided in the touch panel input device 100. FIG. 3 is an explanatory diagram illustrating a schematic configuration of the touch panel 20. FIG. 4 is a diagram illustrating a ground state switching circuit 36.

As illustrated in FIGS. 1 to 3, the touch panel input device 100 includes a display 10, the touch panel 20, and a touch position determination circuit 30.

The display 10 includes a display panel (for example, a liquid crystal panel) for displaying an image. Note that the touch panel input device 100 does not necessarily have to include the display 10, and it is sufficient that the touch panel input device includes at least the touch panel 20 and the touch position determination circuit 30. That is, it is sufficient that the touch panel input device 100 has at least a touch panel function, and the touch panel input device 100 does not necessarily have to include an image display function for displaying an image on the touch panel 20.

The touch panel 20 includes a touch surface 21, a plurality of first electrode lines, a plurality of second electrode lines, and a plurality of capacitances. The plurality of first electrode lines include first electrode lines HL1 to HLM (Ach). The plurality of second electrode lines include second electrode lines VL1 to VLM (Bch). The plurality of capacitances include capacitances C11 to CMM.

The touch surface 21 receives a touch operation. The touch surface 21 may be a touch surface of an electronic blackboard, for example. Further, the touch surface 21 may be a touch surface of a terminal such as a smartphone and a tablet personal computer (PC).

Each of the first electrode lines HL1 to HLM and the second electrode lines VL1 to VLM is arranged on the back side of the touch surface 21. The first electrode lines HL1 to HLM extend along a first direction and are arranged parallel to one another along the first direction. The second electrode lines VL1 to VLM extend along a second direction perpendicular to the first direction and are arranged parallel to one another along the second direction. The second electrode lines VL1 to VLM are arranged to intersect with the first electrode lines HL1 to HLM at a plurality of intersections D11 to DMM. The capacitances C11 to CMM are respectively formed at the intersections D11 to DMM between the first electrode lines HL1 to HLM and the second electrode lines VL1 to VLM.

Hereinafter, the first electrode lines HL1 to HLM may be referred to as a first electrode line group H, and the second electrode lines VL1 to VLM may be referred to as a second electrode line group V. Further, the first electrode lines HL1 to HLM and the second electrode lines VL1 to VLM may be collectively referred to as an electrode line. Furthermore, the intersections D11 to DMM may be collectively referred to as an intersection.

The touch panel 20 including the first electrode line group H and the second electrode line group V is fixed by being bonded to the display 10 or a protective glass (not illustrated). The second electrode line group V is disposed closer to the display 10 than the first electrode line group H. Note that the first electrode line group H may be disposed closer to the display 10 than the second electrode line group V. Although a polyethylene terephthalate (PET) film is actually provided between the first electrode line group H, the second electrode line group V and the display 10, the description for the PET film is omitted in the description of FIG. 3.

The touch position determination circuit 30 is configured by, for example, a semiconductor element (central processing unit (CPU), memory, and so on), a resistor, a capacitor, a coil, and the like. The touch position determination circuit 30 detects the distribution of the values of the capacitances C11 to CMM formed at the intersections D11 to DMM between the first electrode lines HL1 to HLM and the second electrode lines VL1 to VLM on the touch panel 20, and determines a touch position representing the touched position on the touch surface 21.

When a touch operation is performed on the touch surface 21, the capacitance of intersections located around the place where the touch operation is performed among the intersections D11 to DMM changes. As a result, the touch position determination circuit 30 determines the touch position on the touch surface 21 based on the change in the capacitance.

The touch position determination circuit 30 includes a drive circuit 31, a reception circuit 32, an analog to digital (AD) converter 33, a timing generator 34, a detector 35, the ground state switching circuit 36, a recorder 38, and a touch position determiner 39. Note that the timing generator 34 corresponds to an example of a "controller". Further, the touch position determiner 39 corresponds to an example of a "touch detector".

The drive circuit 31 is connected to the first electrode lines HL1 to HLM via the ground state switching circuit 36. The drive circuit 31 is connected to the ground state switching circuit 36 via drive lines DL1 to DLM. The drive circuit 31 inputs a drive signal to each of the first electrode lines HL1 to HLM by applying a voltage to the first electrode lines HL1 to HLM via the drive lines DL1 to DLM.

The reception circuit 32 is connected to the second electrode lines VL1 to VLM via the ground state switching circuit 36. The reception circuit 32 is connected to the ground state switching circuit 36 via sense lines SL1 to SLM. The reception circuit 32 detects an output signal on each of the second electrode lines VL1 to VLM via the sense lines SL1 to SLM. The reception circuit 32 reads information (capacitance information) indicating the linear sum of the electronic charge corresponding to each capacitance (each of capacitances C11 to CMM) by detecting the output signals from the second electrode lines VL1 to VLM via the sense lines SL1 to SLM. Then, the reception circuit 32 transmits the read capacitance information to the AD converter 33. As a result, the AD converter 33 acquires the capacitance information.

The AD converter 33 executes AD-conversion of the capacitance information acquired from the reception circuit 32 and transmits the AD-converted capacitance information to the detector 35. As a result, the detector 35 acquires the AD-converted capacitance information.

The timing generator 34 controls the drive circuit 31, the touch position determiner 39, and the ground state switching circuit 36. The timing generator 34 generates a signal that regulates the operation of the drive circuit 31, a signal that regulates the operation of the reception circuit 32, and a signal that regulates the operation of the AD converter 33, and transmits the signals to the drive circuit 31, the reception circuit 32, and the AD converter 33, respectively.

The detector 35 calculates the capacitance distribution on the touch surface 21 based on the capacitance information acquired from the AD converter 33 and the code sequence. That is, the detector 35 detects a detection value (change in capacitance) based on a change in capacitance (capacitances C11 to CMM) at each intersection (each of the intersections D11 to DMM) formed by the plurality of first electrode lines (first electrode lines HL1 to HLM) and the plurality of second electrode lines (second electrode lines VL1 to VLM).

The detector 35 transmits the detection value (information indicating the capacitance distribution) to the touch position determiner 39. As a result, the touch position determiner 39 acquires the detection value from the detector 35.

The recorder 38 records a determination condition. The determination condition indicates information used by the touch position determiner 39 to determine a touch position on the touch surface 21.

The touch position determiner 39 is electrically connected to the reception circuit 32 via the AD converter 33 and the detector 35. The touch position determiner 39 detects a touch on the touch surface 21 based on a change in the output signal detected by the reception circuit 32 due to a change in the capacitance at the intersections D11 to DMM. For example, the touch position determiner 39 determines a touch position on the touch surface 21 based on the distribution of detected values with respect to the coordinates of a plurality of intersections (intersections D11 to DMM) detected by the detector 35 and the determination condition recorded in the recorder 38.

As illustrated in FIG. 4, the ground state switching circuit 36 switches between a ground state and a non-ground state for each electrode line of the plurality of first electrode lines (first electrode lines HL1 to HLM) and/or the plurality of second electrode lines (second electrode lines VL1 to VLM). According to the present embodiment, the ground state switching circuit 36 switches between the ground state and the non-ground state for each electrode line of the plurality of first electrode lines (first electrode lines HL1 to HLM) and the plurality of second electrode lines (second electrode lines VL1 to VLM).

The ground state switching circuit 36 includes a first ground state switching circuit 361 and a second ground state switching circuit 362. The ground state switching circuit 36 is configured by a plurality of switching circuits.

The drive lines DL1 to DLM, control lines CLa1 to CLaM, a ground GND, and the first electrode lines HL1 to HLM are connected to the first ground state switching circuit 361. The first ground state switching circuit 361 switches between the ground state and the non-ground state of each electrode line for the plurality of first electrode lines (first electrode lines HL1 to HLM). According to the present embodiment, the ground state indicates a state in which the first electrode lines HL1 to HLM are connected to the ground. The non-ground state indicates a state in which the first electrode lines HL1 to HLM are connected to the drive lines DL1 to DLM.

The sense lines SL1 to SLM, the control lines CLb1 to CLbM, the ground GND, and the second electrode lines VL1 to VLM are connected to the second ground state switching circuit 362. The second ground state switching circuit 362 switches between the ground state and the non-ground state for each electrode line of the plurality of second electrode lines (second electrode lines VL1 to VLM). According to the present embodiment, the ground state indicates a state in which the second electrode lines VL1 to VLM are connected to the ground. The non-ground state indicates a state in which the second electrode lines VL1 to VLM are connected to the sense lines SL1 to SLM.

The plurality of first electrode lines (first electrode lines HL1 to HLM) and/or the plurality of second electrode lines (second electrode lines VL1 to VLM) are switched to the ground state by the ground state switching circuit 36, so that it is possible to discharge the electric charges remaining in the plurality of first electrode lines (first electrode lines HL1 to HLM) and/or the plurality of second electrode lines (second electrode lines VL1 to VLM). Therefore, it is possible to reduce noise. As a result, it is possible to suppress deterioration in the determination accuracy of the touch position.

Figure 5A:
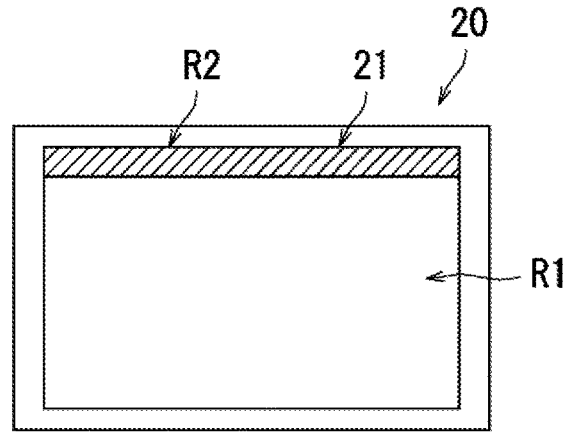
FIG. 5A is a schematic diagram illustrating the touch panel.
Figure 5B:
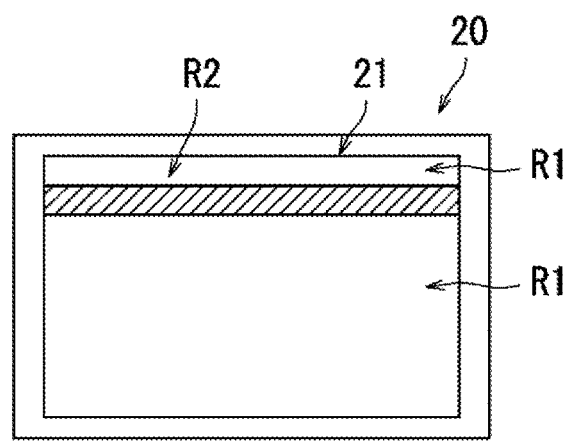
FIG. 5B is a schematic diagram illustrating the touch panel.
Figure 5C:
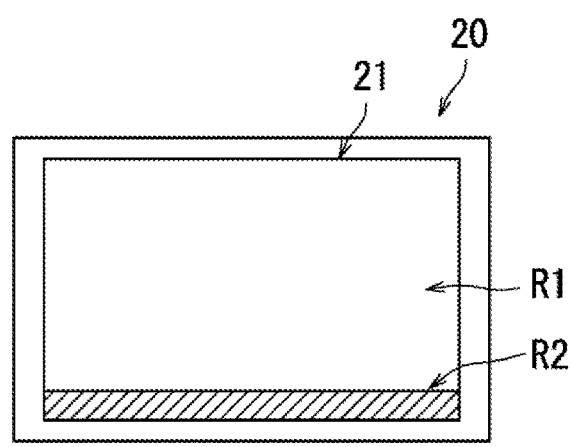
FIG. 5C is a schematic diagram illustrating the touch panel.

Referring to FIGS. 1, 4 and 5A to 5C, an example of drive control executed by the timing generator 34 will be described. FIGS. 5A to 5C are schematic diagrams illustrating the touch panel 20. In FIGS. 5A to 5C, a region R1 indicates a region in which the plurality of first electrode lines (first electrode lines HL1 to HLM) are set to the non-ground state. That is, the region R1 indicates a region in which a touch can be detected. A region R2 indicates a region in which the plurality of first electrode lines (first electrode lines HL1 to HLM) are set to the ground state. The region R2 is illustrated by hatching.

The timing generator 34 executes drive control for causing the drive circuit 31 to sequentially input a drive signal to electrode lines in the non-ground state among each of the plurality of first electrode lines, in a state of controlling the ground state switching circuit 36 to set some electrode lines among each of the plurality of first electrode lines and/or the plurality of second electrode lines to the non-ground state, and set the other electrode lines to the ground state.

For example, as illustrated in FIG. 5A, the timing generator 34 controls the ground state switching circuit 36 so that at least one first electrode line HL located in the region R1 among the plurality of first electrode lines (first electrode lines HL1 to HLM) is set to the non-ground state. Further, the timing generator 34 controls the ground state switching circuit 36 so that at least one first electrode line HL located in the region R2 is set to the ground state. Here, the region R2 is located on the side of the upper end portion of the touch surface 21. The region R2 may correspond to one line of the first electrode line HL or a plurality of lines of the first electrode line HL. The first electrode line (or lines) HL located in the region R2 is set to the ground state, so that it is possible to discharge the electric charges remaining on the first electrode line (or lines) HL located in the region R2. As a result, it is possible to reduce noise. Thereafter, the drive circuit 31 sequentially inputs the drive signal to the electrode line (or lines) in the non-ground state among each of the plurality of first electrode lines HL. As a result, it is possible to detect a touch in the region R1.

Next, as illustrated in FIG. 5B, the timing generator 34 changes an electrode line to be in the non-ground state. That is, the timing generator 34 changes the region R1. Further, the timing generator 34 controls the ground state switching circuit 36 so that the first electrode line (or lines) HL located in the region R2 is set to the ground state. Here, the region R2 is located at a position shifted downward from the region R2 illustrated in FIG. 5A. The size of the region R2 is equal to the size of the region R2 illustrated in FIG. 5A. The first electrode line (or lines) HL located in the region R2 is set to the ground state, so that it is possible discharge the electric charges remaining on the first electrode line (or lines) HL located in the region R2. As a result, it is possible to reduce noise. Thereafter, the drive circuit 31 sequentially inputs the drive signal to the electrode line (or lines) in the non-ground state among each of the plurality of first electrode lines HL. As a result, it is possible to detect a touch in the region R1.

As described above, the timing generator 34 repeatedly executes the drive control while changing the electrode line to be in the non-ground state among each of the plurality of first electrode lines HL and/or the plurality of second electrode lines VL. That is, the timing generator 34 repeatedly executes the drive control while changing the region R1. In other words, the timing generator 34 repeatedly executes the drive control while changing the region R2.

Here, the timing generator 34 repeatedly executes the drive control while shifting the region R2 downward from the upper end portion as illustrated in FIG. 5A until the region R2 is positioned at the lower end portion as illustrated in FIG. 5C. In this manner, the timing generator 34 periodically repeats the drive control until all of the plurality of first electrode lines and/or the plurality of second electrode lines are set to the non-ground state at least once. Therefore, all of the plurality of first electrode lines (first electrode lines HL1 to HLM) can be set to the ground state. As a result, it is possible to discharge the electric charges remaining on all of the plurality of first electrode lines (first electrode lines HL1 to HLM). Therefore, it is possible to reduce noise. As a result, it is possible to suppress deterioration in the determination accuracy of the touch position.

Figure 6A:
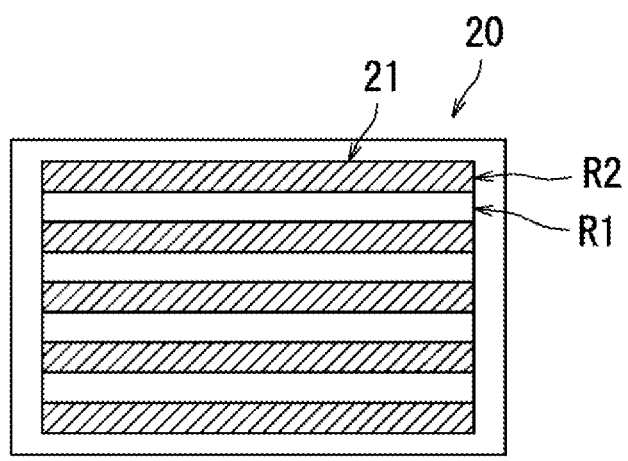
FIG. 6A is a schematic diagram illustrating the touch panel.
Figure 6B:
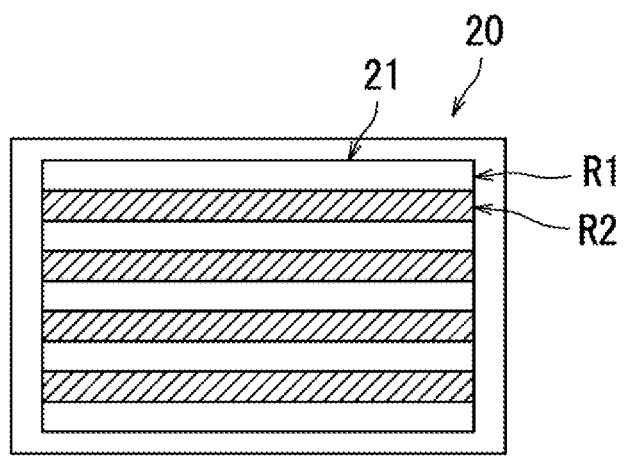
FIG. 6B is a schematic diagram illustrating the touch panel.

Next, an example of the drive control executed by the timing generator 34 will be described with reference to FIGS. 1, 4, 6A and 6B. FIGS. 6A and 6B are schematic diagrams illustrating the touch panel 20.

The timing generator 34 sets some electrode lines to the non-ground state to executes first drive control, and subsequently sets the electrode lines set to the non-ground state in the first drive control to the ground state to executes second drive control. Specifically, in the first drive control, the timing generator 34 sets the even-numbered electrode lines among the plurality of first electrode lines and/or the plurality of second electrode lines to the non-ground state to execute the drive control. Then, in the second drive control, the timing generator 34 sets the odd-numbered electrode lines among the plurality of first electrode lines and/or the plurality of second electrode lines to the non-ground state to execute the drive control.

For example, as illustrated in FIG. 6A, in the first drive control, the timing generator 34 sets the even-numbered first electrode lines (first electrode lines HL2, HL4, . . . , HLM) among the plurality of first electrode lines (first electrode lines HL1 to HLM) to the non-ground state to execute the drive control. Then, as illustrated in FIG. 6B, in the second drive control, the timing generator 34 sets the odd-numbered first electrode lines (first electrode lines HL1, HL3, . . . , HLM−1) among the plurality of first electrode lines (first electrode lines HL1 to HLM) to the non-ground state to execute the drive control. Thus, the drive control is executed by dividing into the even-numbered first electrode lines and the odd-numbered first electrode lines in the column, so that it is possible to suppress crosstalk. Therefore, it is possible to reduce noise. As a result, it is possible to suppress deterioration in the determination accuracy of the touch position.

Figure 7A:
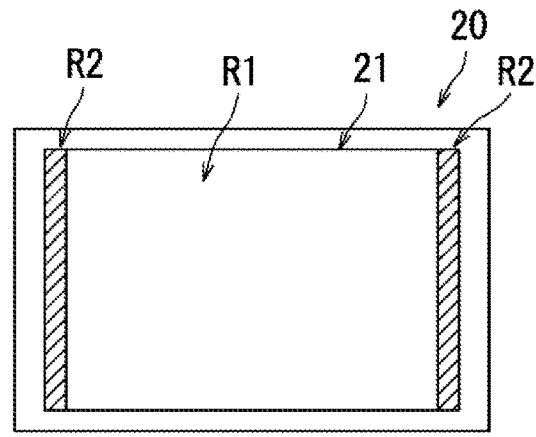
FIG. 7A is a schematic diagram illustrating the touch panel.
Figure 7B:
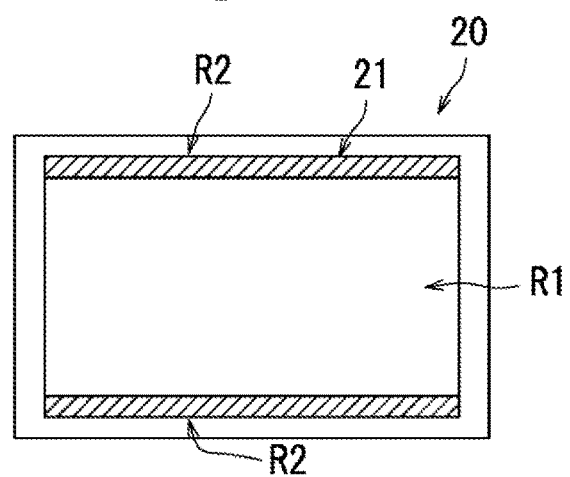
FIG. 7B is a schematic diagram illustrating the touch panel.
Figure 7C:
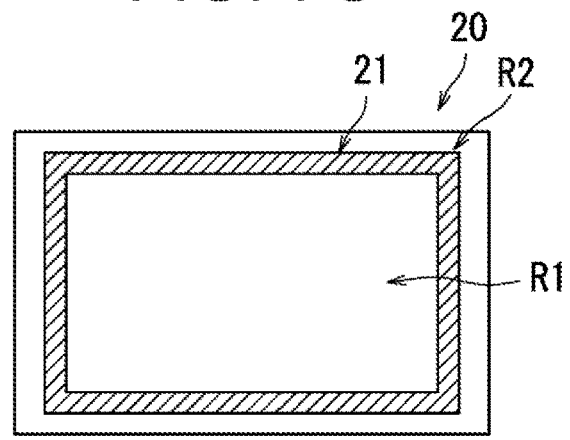
FIG. 7C is a schematic diagram illustrating the touch panel.

Next, an example of the drive control executed by the timing generator 34 will be described with reference to FIGS. 1, 4 and 7A to 7C. FIGS. 7A to 7C are schematic diagrams illustrating the touch panel 20.

In general, the touch panel 20 may be affected by noise occurred from the display 10. The influence of the noise occurred from the display 10 is likely to occur at the end portion of the touch panel 20. This is because the end portion of the display 10 is affected by signal noise occurred from a drive circuit such as a gate driver and a source driver arranged at the end portion of the display 10. Therefore, it is preferable that the timing generator 34 controls the ground state switching circuit 36 such that some electrode lines located at the end portion of the display 10 are set to the ground state.

The timing generator 34 causes the drive circuit 31 to sequentially input a drive signal to electrode lines in the non-ground state among each of the plurality of first electrode lines, in a state of controlling the ground state switching circuit 36 to set some electrode lines located at the end portion of the touch surface 21 among each of the plurality of first electrode lines and/or the plurality of second electrode lines to the ground state, and set the other electrode lines to the non-ground state.

For example, as illustrated in FIG. 7A, the timing generator 34 may control the ground state switching circuit 36 so that some electrode lines located at the end portions of the left and right sides are set to the ground state. Specifically, the timing generator 34 controls the ground state switching circuit 36 so that some second electrode lines VL located at the end portion of the touch surface 21 among each of the plurality of second electrode lines (second electrode lines VL1 to VLM) are set to the ground state and the other second electrode lines VL are set to the non-ground state. As a result, the second electrode lines VL1 to VLM located in the region R2 are set to the ground state. Therefore, the second electrode lines VL located in the region R2 are set to the ground state, so that it is possible to discharge the electric charges remaining on the second electrode lines VL located in the region R2. As a result, it is possible to reduce noise. Thereafter, the drive circuit 31 sequentially inputs the drive signal to the electrode lines which are in the non-ground state among each of the plurality of first electrode lines HL. As a result, it is possible to detect a touch in the region R1.

Further, for example, as illustrated in FIG. 7B, the timing generator 34 may control the ground state switching circuit 36 so that some electrode lines located at the upper and lower end portions are set to the ground state. Specifically, the timing generator 34 controls the ground state switching circuit 36 such that some first electrode lines HL located at the end portion of the touch surface 21 among the plurality of first electrode lines (first electrode lines HL1 to HLM) are set to the ground state and the other first electrode lines HL are set to the non-ground state. As a result, the first electrode lines HL1 to HLM located in the region R2 are set to the ground state. Therefore, the first electrode lines HL located in the region R2 are set to the ground state, so that it is possible to discharge the electric charges remaining on the first electrode lines HL located in the region R2. As a result, it is possible to reduce noise. Thereafter, the drive circuit 31 sequentially inputs the drive signal to the electrode lines which are in the non-ground state among the plurality of first electrode lines HL. As a result, it is possible to detect a touch in the region R1.

Further, for example, as illustrated in FIG. 7C, the timing generator 34 may control the ground state switching circuit 36 so that some electrode lines located at the end portions of the upper, lower, left, and right sides are set to the ground state. Specifically, the timing generator 34 controls the ground state switching circuit 36 such that a part of the first electrode lines HL and the second electrode lines VL located at the end portion of the touch surface 21 among the plurality of first electrode lines (first electrode lines HL1 to HLM) and the plurality of second electrode lines (second electrode lines VL1 to VLM) is set to the ground state and the other first electrode lines HL and second electrode lines VL are set to the non-ground state. As a result, the first electrode lines HL1 to HLM located in the region R2 are set to the ground state. Therefore, the first electrode lines HL and the second electrode lines VL located in the region R2 are set to the ground state, so that it is possible to discharge the electric charges remaining in the first electrode lines HL and the second electrode lines VL located in the region R2. As a result, it is possible to reduce noise on the first electrode lines HL and the second electrode lines VL. Thereafter, the drive circuit 31 sequentially inputs the drive signal to the electrode lines which are in the non-ground state among each of the plurality of first electrode lines HL. As a result, it is possible to detect a touch in the region R1.

Note that the timing generator 34 may execute initial control for setting the plurality of first electrode lines and/or the plurality of second electrode lines to the ground state by the ground state switching circuit 36 when the touch panel input device 100 is started, and may execute the drive control after the initial control is executed. For example, the timing generator 34 controls the ground state switching circuit 36 so that all of the plurality of first electrode lines (first electrode lines HL1 to HLM) and the plurality of second electrode lines (second electrode lines VL1 to VLM) are set to the ground state when the touch panel input device 100 is started. Accordingly, it is possible to reduce noise on the plurality of first electrode lines (first electrode lines HL1 to HLM) and the plurality of second electrode lines (second electrode lines VL1 to VLM). As a result, it is possible to suppress deterioration in the determination accuracy of the touch position.

As described above with reference to FIGS. 1 to 7C, the controller (timing generator 34) executes the drive control that causes the drive circuit 31 to sequentially inputs the drive signal to electrode lines in the non-ground state among each of the plurality of first electrode lines, in a state where the controller controls the ground state switching circuit 36 so that some electrode lines among each of the plurality of first electrode lines (first electrode lines HL1 to HLM) and/or the plurality of second electrode lines (second electrode lines VL1 to VLM) are set to the non-ground state and the other electrode lines are set to the ground state. Therefore, it is possible to reduce noise on the plurality of first electrode lines (first electrode lines HL1 to HLM) and/or the plurality of second electrode lines (second electrode lines VL1 to VLM). As a result, it is possible to suppress deterioration in the determination accuracy of the touch position.

Second Embodiment

Figure 8:
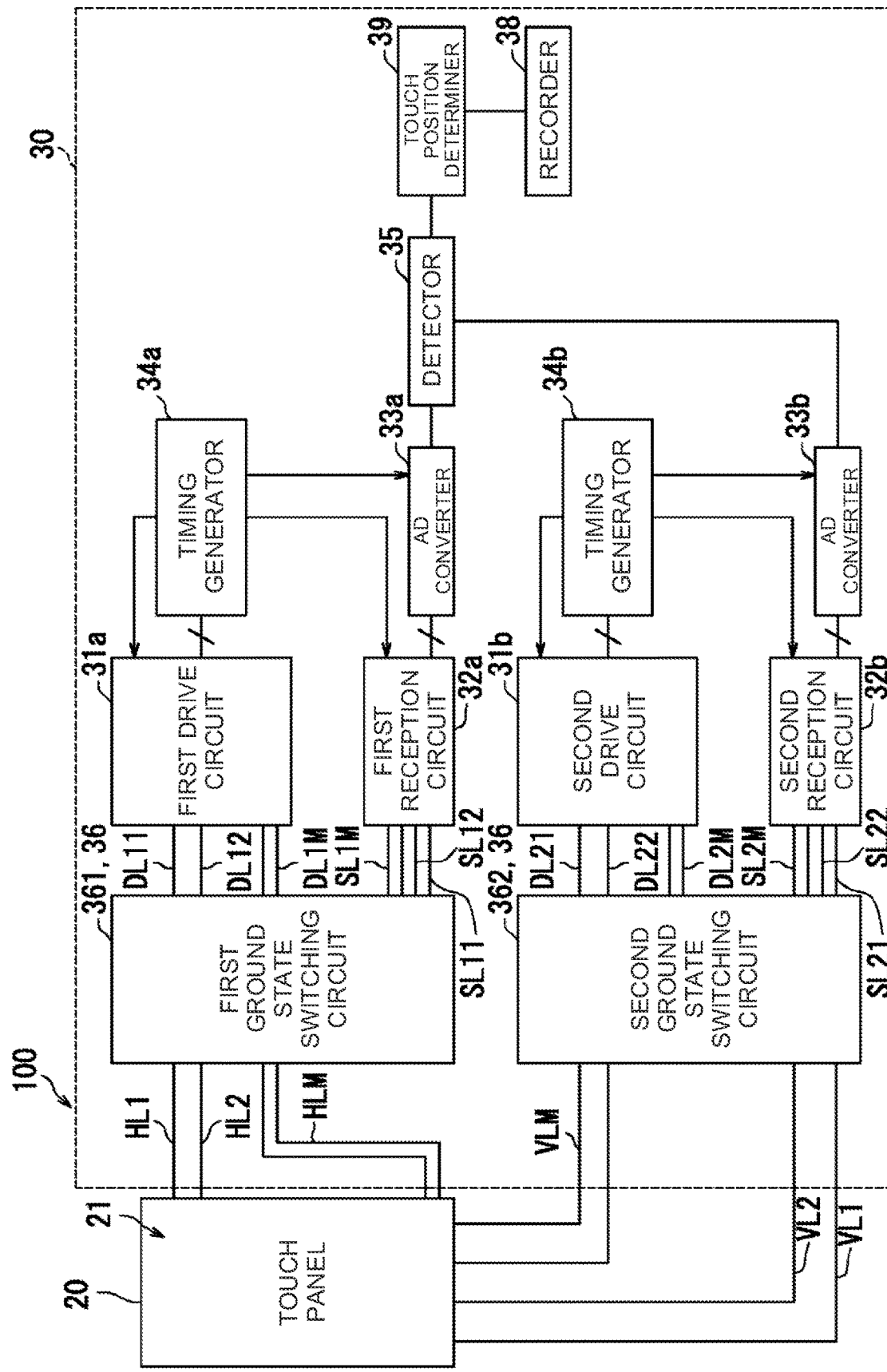
FIG. 8 is a block diagram illustrating a configuration of a touch panel input device according to a second embodiment of the present disclosure.
Figure 9:
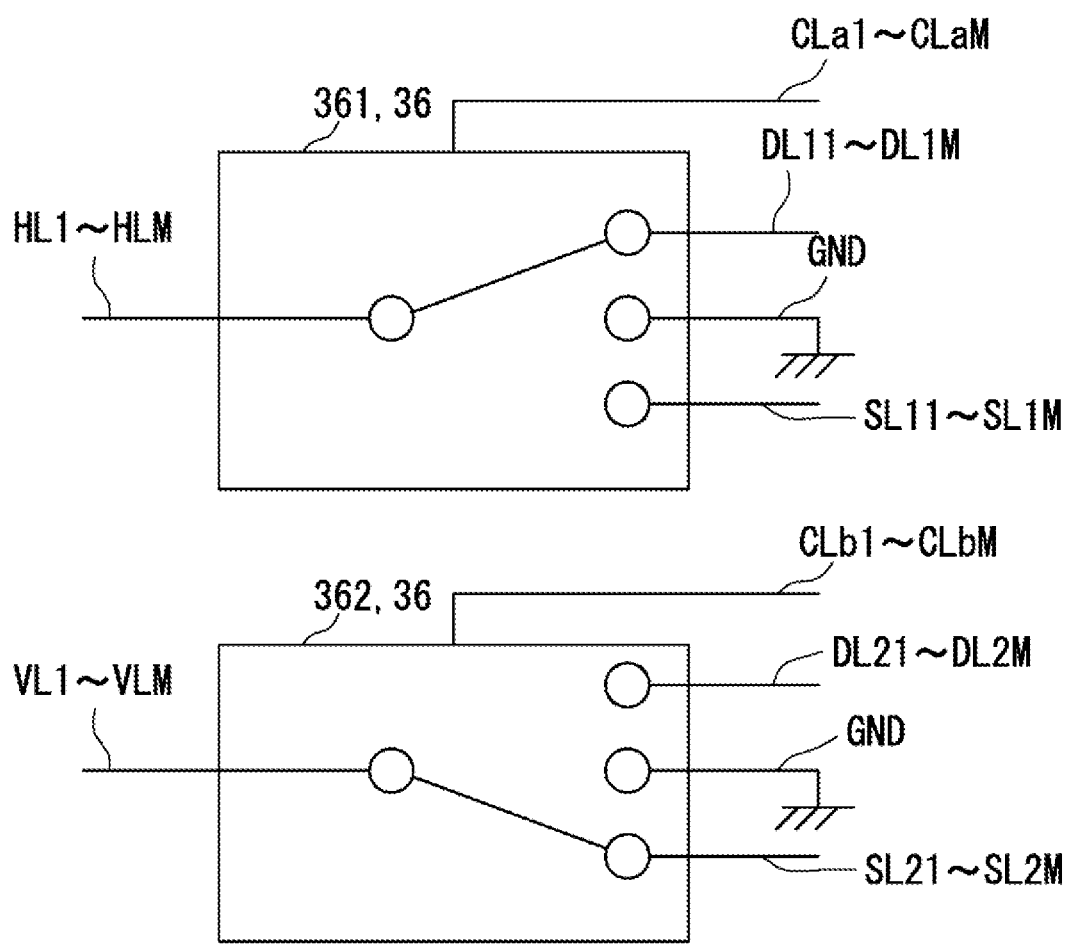
FIG. 9 is a diagram illustrating a first ground state switching circuit and a second ground state switching circuit.

Referring to FIGS. 8 and 9, the touch panel input device 100 according to a second embodiment of the present disclosure will be described. FIG. 8 is a block diagram illustrating a configuration of the touch panel input device 100 according to the second embodiment of the present disclosure. FIG. 9 is a diagram illustrating the first ground state switching circuit 361 and the second ground state switching circuit 362. The touch panel input device 100 according to the second embodiment is mainly different from the touch panel input device 100 according to the first embodiment in that the connection of the first electrode lines HL can be switched by drive lines DL11 to DL1M, sense lines SL11 to SL1M and the ground GND, and the connection of the second electrode lines VL can be switched by drive lines DL21 to DL2M, sense lines SL21 to SL2M and the ground GND. Hereafter, the difference between the second embodiment and the first embodiment will be mainly described below.

As illustrated in FIG. 8, the touch position determination circuit 30 includes a first drive circuit 31a, a first reception circuit 32a, an AD converter 33a, a timing generator 34a, the first ground state switching circuit 361, the second drive circuit 31b, a second reception circuit 32b, an AD converter 33b, a timing generator 34b, the second ground state switching circuit 362, the detector 35, the recorder 38, and the touch position determiner 39.

Since the first drive circuit 31a and the second drive circuit 31b have the same configuration as that of the drive circuit 31 illustrated in FIG. 1, the description thereof will be omitted. Since the first reception circuit 32a and the second reception circuit 32b have the same configuration as that of the reception circuit 32 illustrated in FIG. 1, the description thereof will be omitted. Since the AD converter 33a and the AD converter 33b have the same configuration as the AD converter 33 illustrated in FIG. 1, the description thereof will be omitted. Since the timing generator 34a and the timing generator 34b have the same configuration as that of the timing generator 34 illustrated in FIG. 1, the description thereof will be omitted. Since each of the detector 35, the recorder 38, and the touch position determiner 39 has the same configuration as that of the corresponding one of the detectors 35, the recorder 38, and the touch position determiner 39 illustrated in FIG. 1 will be omitted.

The first drive circuit 31a is connected to the first ground state switching circuit 361 via the drive lines DL11 to DL1M. The first reception circuit 32a is connected to the first ground state switching circuit 361 via the sense lines SL11 to SL1M.

The second drive circuit 31b is connected to the second ground state switching circuit 362 via the drive lines DL21 to DL2M. The second reception circuit 32b is connected to the second ground state switching circuit 362 via the sense lines SL21 to SL2M.

As illustrated in FIG. 9, the drive lines DL11 to DL1M, the sense lines SL11 to SL1M, the control lines CLa1 to CLaM, the ground GND, and the first electrode lines HL1 to HLM are connected to the first ground state switching circuit 361. The first ground state switching circuit 361 switches between the ground state and the non-ground state for each electrode line of the plurality of first electrode lines (first electrode lines HL1 to HLM). According to the present embodiment, the ground state indicates a state in which the first electrode lines HL1 to HLM are connected to the ground GND. The non-ground state indicates a state in which the first electrode lines HL1 to HLM are connected to the drive lines DL11 to DL1M or the sense lines SL11 to SL1M.

The drive lines DL21 to DL2M, the sense lines SL21 to SL2M, the control lines CLb1 to CLbM, the ground GND, and the second electrode lines VL1 to VLM are connected to the second ground state switching circuit 362. The second ground state switching circuit 362 switches between the ground state and the non-ground state for each electrode line of the plurality of second electrode lines (second electrode lines VL1 to VLM). According to the present embodiment, the ground state indicates a state in which the second electrode lines VL1 to VLM are connected to the ground. The non-ground state indicates a state in which the second electrode lines VL1 to VLM are connected to the drive lines DL21 to DL2M or the sense lines SL21 to SL2M.

According to the present embodiment, the touch panel input device 100 alternately executes first processing and second processing. The first processing is a process in which a drive signal is input from the first drive circuit 31a to the first electrode lines HL1 to HLM and output signals from the second electrode lines VL1 to VLM are detected by the second reception circuit 32b. The second processing is a process in which a drive signal is input from the second drive circuit 31b to the second electrode lines VL1 to VLM, and output signals from the first electrode lines HL1 to HLM are detected by the first reception circuit 32a. As described above, according to the present embodiment, the touch panel input device 100 alternately exchanges the electrode lines for inputting the drive signal and the electrode lines for detecting the output signals between the first electrode lines HL1 to HLM and the second electrode lines VL1 to VLM to detect a touch.

According to the present embodiment, as in the first embodiment, the ground state switching circuit 36 switches the plurality of first electrode lines (first electrode lines HL1 to HLM) and/or the plurality of second electrode lines (second electrode lines VL1 to VLM) to the ground state, so that it is possible to discharge the electric charges remaining in the plurality of first electrode lines (first electrode lines HL1 to HLM) and/or the plurality of second electrode lines (second electrode lines VL1 to VLM). Therefore, it is possible to reduce noise. As a result, it is possible to suppress deterioration in the determination accuracy of the touch position.

The embodiments of the present disclosure have been described above with reference to the drawings (FIGS. 1 to 9). However, the present disclosure is not limited to the above-described embodiments, and can be implemented without departing from the scope of the present embodiments. Further, it is possible to implement various disclosures by appropriately combining the plurality of components disclosed in the above embodiments. For example, some components may be removed from all components illustrated in the embodiments. In the drawings, for the sake of easy understanding, each component is schematically illustrated, and the number and the like of each component illustrated in the drawings may be different from actual number and the like due to the convenience of drawing preparation. Further, each component illustrated in the above embodiments is an example, and is not particularly limited, and various modifications can be made without substantially deviating from the effects of the present disclosure.

What is claimed is:

1. A touch panel input device comprising a touch surface, the touch panel input device comprising:
   a plurality of first electrode lines arranged to extend along a first direction;
   a plurality of second electrode lines arranged to extend in a second direction and intersect with the plurality of first electrode lines at a plurality of intersections;
   a drive circuit that inputs a drive signal to each of the plurality of first electrode lines;
   a reception circuit that detects an output signal on each of the plurality of second electrode lines;
   a touch detector that detects a touch on the touch surface based on a change in the output signals detected by the reception circuit caused by a change in capacitance at at least one intersection among the plurality of intersections;
   a ground state switching circuit that switches between a ground state and a non-ground state for each electrode line of either or both of the plurality of first electrode lines and the plurality of second electrode lines; and
   a controller that controls the drive circuit, the touch detector, and the ground state switching circuit,
   wherein the controller executes drive control for causing the drive circuit to sequentially input a drive signal to electrode lines in a non-ground state among each of the plurality of first electrode lines, in a state of controlling the ground state switching circuit to set a part of electrode lines among each electrode line of either or both of the plurality of first electrode lines and the plurality of second electrode lines to a non-ground state, and set the other electrode lines to a ground state,
   wherein the controller repeatedly executes the drive control while changing an electrode line to be in a non-ground state among each electrode line of either or both of the plurality of first electrode lines and the plurality of second electrode lines,
   wherein the controller sets some electrode lines to a non-ground state to execute the drive control for a first time, and then sets the electrode lines set to the non-ground state in the drive control for the first time to a ground state to execute the drive control for a second time,
   wherein in the drive control for the first time, the controller sets even-numbered electrode lines to a non-ground state among either or both of the plurality of first electrode lines and the plurality of second electrode lines to execute the drive control, and
   wherein in the drive control for the second time, the controller sets odd-numbered electrode lines to a non-ground state among either or both of the plurality of first electrode lines and the plurality of second electrode lines to execute the drive control.

2. The touch panel input device according to claim 1, wherein the controller repeats periods of execution of the drive control, each of the periods being until all of either or both of the plurality of first electrode lines and the plurality of second electrode lines are set to a non-ground state at least once.

3. The touch panel input device according to claim 1, wherein the controller executes an initial control that causes the ground state switching circuit to set either or both of the plurality of first electrode lines and the plurality of second electrode lines to a ground state when the touch panel input device is started, and executes the drive control after the initial control is executed.

4. A touch panel input device comprising a touch surface, the touch panel input device comprising:
   a plurality of first electrode lines arranged to extend along a first direction;
   a plurality of second electrode lines arranged to extend in a second direction and intersect with the plurality of first electrode lines at a plurality of intersections;
   a drive circuit that inputs a drive signal to each of the plurality of first electrode lines;
   a reception circuit that detects an output signal on each of the plurality of second electrode lines;
   a touch detector that detects a touch on the touch surface based on a change in the output signals detected by the reception circuit caused by a change in capacitance at at least one intersection among the plurality of intersections;
   a ground state switching circuit that switches between a ground state and a non-ground state for each electrode line of either or both of the plurality of first electrode lines and the plurality of second electrode lines; and
   a controller that controls the drive circuit, the touch detector, and the ground state switching circuit,
   wherein the controller executes drive control for causing the drive circuit to sequentially input a drive signal to electrode lines in a non-ground state among each of the plurality of first electrode lines, in a state of controlling the ground state switching circuit to set a part of electrode lines among each electrode line of either or both of the plurality of first electrode lines and the plurality of second electrode lines to a non-ground state, and set the other electrode lines to a ground state, and
   wherein the controller executes the drive control for causing the drive circuit to sequentially input a drive signal to electrode lines in a non-ground state among each of the plurality of first electrode lines, in a state where the controller controls the ground state switching circuit so that a part of electrode lines located at an end portion of the touch surface among each electrode line in either or both of the plurality of first electrode lines and the plurality of second electrode lines is set to a ground state and the other electrode lines are set to a non-ground state.

5. The touch panel input device according to claim 4, wherein the controller executes an initial control that causes the ground state switching circuit to set either or both of the plurality of first electrode lines and the plurality of second electrode lines to a ground state when the touch panel input device is started, and executes the drive control after the initial control is executed.

* * * * *